United States Patent [19]  
Wrigglesworth

[11] 4,077,728  
[45] Mar. 7, 1978

[54] DISTORTION OF PLASTIC PARTS ALIGNS NON-COAXIAL MEMBERS

[75] Inventor: Norman A. Wrigglesworth, Williamsville, N.Y.

[73] Assignee: The Quaker Oats Company, Chicago, Ill.

[21] Appl. No.: 766,255

[22] Filed: Feb. 7, 1977

[51] Int. Cl.² ............................ F16B 7/04; F16B 9/02
[52] U.S. Cl. .................................. 403/186; 403/291; 403/361; 182/107
[58] Field of Search ............... 403/186, 361, 389, 291; 182/107, 108, 178, 228; 248/160, 188.8; 108/111, 114

[56] References Cited

U.S. PATENT DOCUMENTS

| | | | |
|---|---|---|---|
| 1,676,618 | 7/1928 | Morris | 182/107 |
| 2,993,561 | 7/1961 | Watson | 182/107 X |
| 3,163,437 | 12/1964 | Phillipson | 403/361 X |
| 3,190,405 | 6/1965 | Squire | 182/178 UX |
| 3,345,040 | 10/1967 | Rivelli | 256/37 |
| 3,646,696 | 3/1972 | Sarkisian | 248/160 X |
| 4,023,647 | 5/1977 | Confer | 182/108 |

Primary Examiner—Wayne L. Shedd  
Attorney, Agent, or Firm—Cumpston & Shaw

[57] ABSTRACT

A plurality of substantially parallel, laterally spaced, male parts formed of a plastic having low dimensional stability are removably insertable into a base member of similar plastic having a similarly arranged plurality of sockets. If the spacings of the male and female members do not exactly coincide, both the male members and the walls of the sockets may be distorted a substantial amount, thereby premitting insertion of the male members into the sockets in spite of the misalignment of the members.

3 Claims, 4 Drawing Figures

4,077,728

DISTORTION OF PLASTIC PARTS ALIGNS NON-COAXIAL MEMBERS

BACKGROUND OF THE INVENTION

1. Field of the Invention

This invention relates generally to joining two plastic parts by inserting spaced apart projections on a male part into complementary spaced apart openings in the female part. More specifically, the invention relates to improved projection structure which allows proper insertion of the projections into complementary openings even though the distance between the centers of the projections varies considerably from the distance between the centers of the openings.

2. Description of the Prior Art

It is known in the prior art to join male and female plastic parts by providing the female part with a pair of spaced apart openings of one configuration and the male part with a pair of projections of similar configuration insertable within complementary openings of the female part. For such plastic parts to be joined satisfactorily, the parts must be manufactured to relatively close tolerances so that the center-to-center distance between the openings is substantially equal to the center-to-center distance between the projections. This necessitates the use of plastic materials having high dimensional stability which greatly increases the cost of manufacture. If less expensive plastic materials of lower dimensional stability are used, the distances between the centers of the openings and between the centers of the projections may vary to the point that the parts cannot be joined properly. These problems, among others, are overcome by Applicant's invention which is directed to an improved projection structure which allows insertion of the projections of the male part into corresponding openings in the female part for joining the plastic parts even if the distances between the centers of the projections and openings vary considerably. This allows molding of one or both of the parts out of a plastic material having relatively low dimensional stability.

SUMMARY OF THE INVENTION

In accordance with a preferred embodiment of the invention, the projections on a male plastic part are designed to fit into corresponding openings in a female plastic part for joining the two parts together even though the center-to-center distance between the projections may vary considerably from the center-to-center distance between the openings. One of the projections has in cross section a plurality of points such as formed, for example, by a triangle, and the other projection has a cylindrical core having a pair of opposed, radially extending ears. The male projection having the triangular cross section fits snugly within a female opening with only point contact between the mating parts. Since the female opening can deform somewhat under load, such parts can be joined even if the male part is slightly larger than the female part. The projection with the ears fits snugly in the other female opening. The ears extend substantially in a plane perpendicular to the plane in which the centers of the projections lie. Since the ears are substantially nonflexible and engage the inner wall of the female opening at only two points, they force the female opening to deform or flex to accommodate the projection, regardless of the fact that the distance between the centers of the projections is greater or less than the distance between the centers of the female openings.

The new features of Applicant's invention are as follows:

1. Providing a male projection having a cross section such as triangular or the like forming a plurality of points snugly engaging the periphery of a corresponding female opening when the projection is inserted into the opening.
2. Providing a male projection having radially extending, opposed ears normally lying in a plane substantially perpendicular to a plane in which the projections lie.
3. Providing female openings capable of limited deformation or movement when forced apart or towards each other by the action of the two male projections.

The invention and its advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
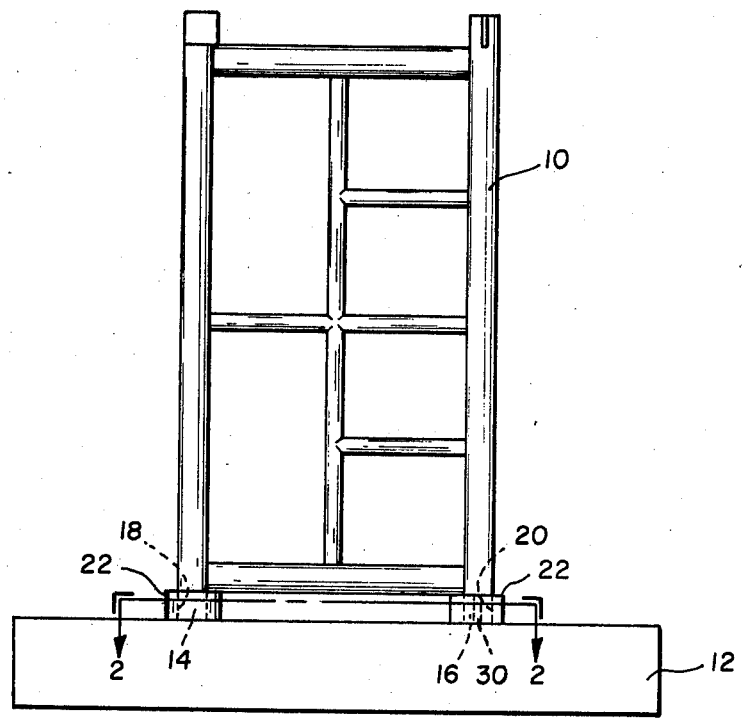
FIG. 1 is a side elevational view of one plastic part such as a ladder joined to another plastic part such as a base by a pair of spaced apart male projections on the ladder inserted into a pair of complementary female openings in the base.

With reference to FIG. 1, a ladder 10 molded out of a thermoplastic material having low dimensional stability is releasably secured to a base member 12 preferably of a thermoplastic material having a low dimensional stability. The ladder 10 has a pair of spaced apart male projections 14 and 16 which are frictionally inserted into complementary female openings 18 and 20, respectively, in bosses 22 of base 12 for releasably securing the two together.

Figure 2:
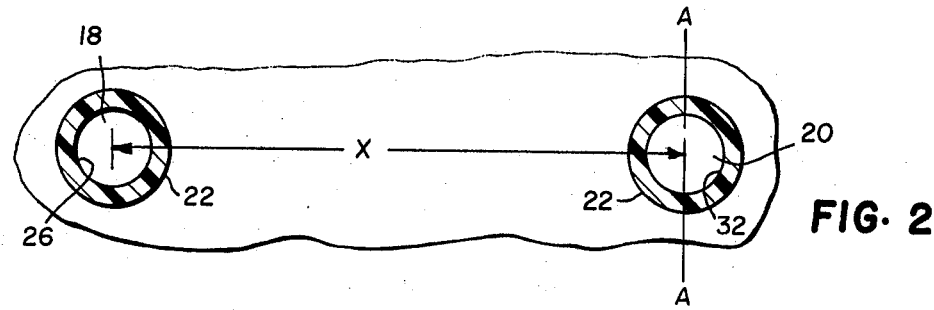
FIG. 2 is an enlarged view in section taken substantially along line 2—2 of FIG. 1 with the projections of the ladder omitted.

With reference to FIG. 2, the openings 18 and 20 in base 12 are shown having a center-to-center distance of a predetermined dimension X. Since base 12 is preferably molded out of a plastic material having low dimensional stability, the distance X may vary slightly from base to base.

Figure 3:
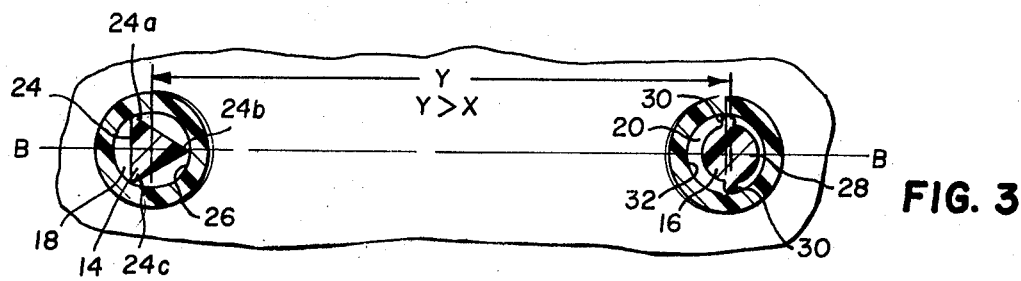
FIG. 3 is a section view similar to FIG. 2 showing the position of the male projections relative to the female openings where the distance between the centers of the projections is greater than the distance between the centers of the openings.
Figure 4:
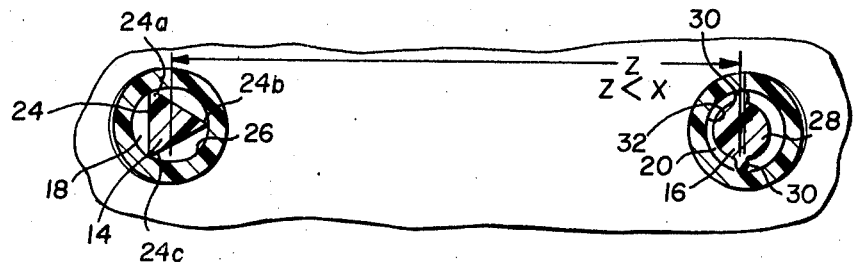
FIG. 4 is a view similar to FIG. 3 showing the positions of the projections relative to the openings when the distance between the centers of the projections is less than the distance between the centers of the openings.

With reference to FIGS. 3 and 4, the cross section of projections 14 and 16 within openings 18 and 20, respectively, are illustrated. Projection 14 has a cross section that is triangular thereby providing three points 24a, 24b and 24c adapted to snugly engage the periphery 26 of opening 18. Although projection 14 may vary slightly in cross sectional area due to the low dimensional stability of the plastic material from which it is molded, since only point contact is made with periphery 26 of the opening, it is possible to manually force projection 14 into opening 18 with ease even if the cross sectional area is slightly too large. Projection 16 has a cylindrical core 28 and a pair of opposed, radially extending ears 30 adapted to snugly engage the periphery 32 of complementary opening 20.

When the center distance X between openings 18 and 20 is equal to the center-to-center distance between projections 14 and 16, the parts will snugly fit together and ears 30 will lie in a plane A—A that is substantially perpendicular to a plane B—B in which the centers of the projections lie. In addition, under such circumstances, openings 18 and 20 will remain substantially circular as shown in FIG. 2, and the center of each of the projections will be coincident with the center of the respective opening.

However, if the distance between the centers of projections 14 and 16 is a distance Y as seen in FIG. 3 which is greater than distance X; i.e. Y>X, ears 30 will flex slightly toward projection 14, while both openings 18 and 20 will deform to accommodate the spreading force resulting from the fact that Y is greater than X. The deformation of openings 18 and 20 is shown in somewhat exaggerated form in FIG. 3 for purposes of illustration, wherein it will be seen that the upper portion of opening 18 is moved to the left, and the opening is flattened somewhat between the points 24a and 24c of projection 14. The center of projection 14 remains substantially coincident with the center of opening 18.

The upper portion of opening 20 is deformed by the spreading action, and the center of projection 28 is moved to the right of the center of opening 20 as shown. Although ears 30 flex slightly towards projection 14 and the legs of the ladder will splay slightly to accommodate the spreading action, the primary accommodation results from the deformation or movement of upper portions of the bosses 22 forming openings 20 and 18.

In FIG. 4, the center-to-center distance between projections 14 and 16 is designated Z which is shown as less than the center-to-center distance X between openings 18 and 20; i.e. X<X. In this latter situation, although ears 30 will flex slightly away from projection 14 and the legs of the ladder will move slightly towards each other, the primary accommodation for the narrow spacing results from the deformation or movement of upper portions of bosses 22 carrying openings 18 and 20, as shown in FIG. 4. In this instance, the primary load is on point 24b of projection 14, and opening 18 is moved slightly to the right as viewed in FIG. 4, thereby keeping the center of projection 14 coincident with the center of opening 18. Opening 20 becomes somewhat egg-shaped as shown from the action of projection 28 and ears 30, and the center of projection 16 is moved to the left of the center of opening 20 as shown.

Since the bottom of bosses 22 are fixed to base 12, the deformation of movement of the bosses occurs above their base line, and for this reason triangular projection 14 is spaced slightly upwardly from the bottom of the leg of the ladder upon which it is formed. Similarly, ears 30 are spaced upwardly from the lower end or bottom of the adjacent leg of the ladder.

Since the ladder snugly fits base 12 regardless of the differences in spacing between projections 14 and 16 on the one hand and between openings 18 and 20 in bosses 22 on the other hand, the ladder section 10 may be snugly fitted to the base and the base may be readily picked up by the ladder and yet may be readily separated without damage to either the ladder or base. In addition, a blow at right angles to the ladder will cause the same to separate from the base, again without damage to either the ladder or the base.

Accordingly, with projections and bosses designed as described, ladders 10 can be molded out of plastic material of low dimensional stability with the projections 14 and 16 spaced apart by varying distances such as Y and Z which are greater or less than the center-to-center distance X between openings 18 and 20 in bosses 22. However, projections 14 and 16 can still be inserted with ease into openings 18 and 20 for tightly securing the ladder to the base while allowing the ladder to be readily detached from the base without damage to the ladder or the base. The present invention works well when both the ladder and base portions are made of materials having low dimensional stability, but also works well in those situations where either the base or the ladder is made of a material having a high dimensional stability.

The invention has been described in detail with particular reference to a preferred embodiment, but it will be understood that variations and modifications can be effected within the spirit and scope of the invention as described hereinabove.

What is claimed is:

1. Structure for releasably securing male and female plastic parts together comprising:
    a female part preferably molded out of plastic material of low dimensional stability and having a pair of spaced apart openings having a distance between the centers thereof; and
    a male part preferably molded out of a plastic material of low dimensional stability and having a pair of spaced apart projections adapted to be inserted into said pair of openings for releasably securing said female and male parts together, one of said projections having a pair of radially extending, opposed ears, said opening being adapted to deform toward or away from each other for allowing said projections to seat within said openings even if the distance between the centers of said projections varies from part to part and is different than said distance between the centers of said openings.

2. The securing means of claim 1 wherein said other of said projections has a cross section containing a plurality of points.

3. The securing means of claim 1 wherein each of said openings is circular and of a fixed diameter, said centers of said projections lie in a first plane and one projection has a cylindrical core of a diameter less than said fixed diameter, and said flexible ears are integral with and extend from said core and normally lie in a second plane perpendicular to said first plane, and said other of said projections has a triangular-shaped cross section with the points of the triangle snugly engaging the periphery of said opening and with one of the points of the triangle facing said one projection.

* * * * *